Dec. 28, 1926.  1,612,223
D. A. ROBINSON
GRAVITY DUMPING TRUCK BODY
Filed Jan. 16, 1922  3 Sheets-Sheet 2

INVENTOR
DIGHTON A. ROBINSON
By Paul & Paul
ATTORNEYS

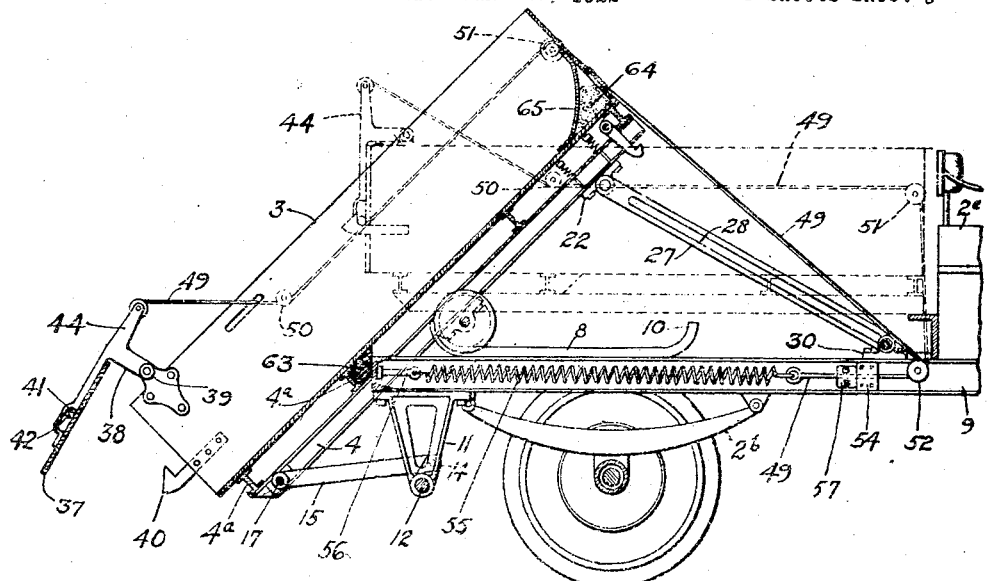
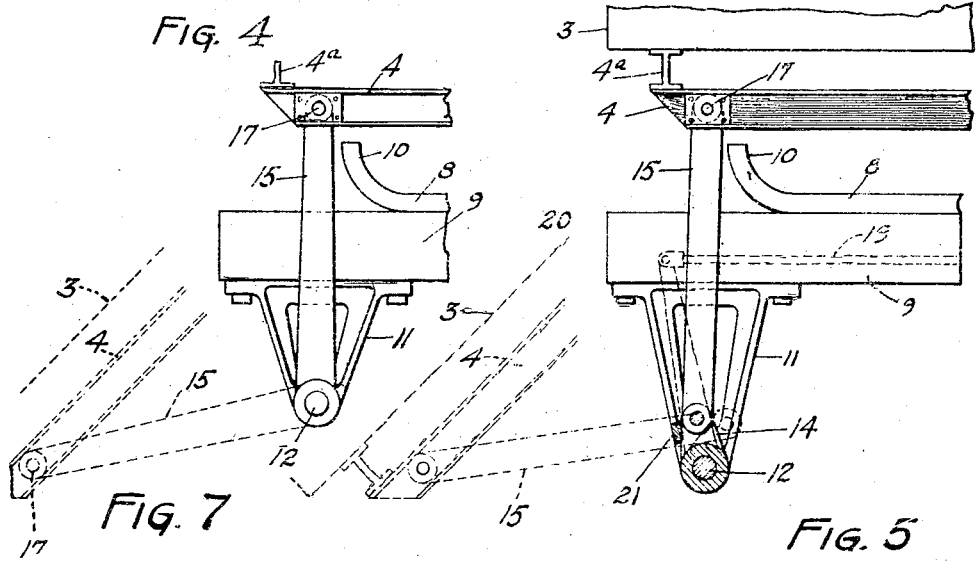
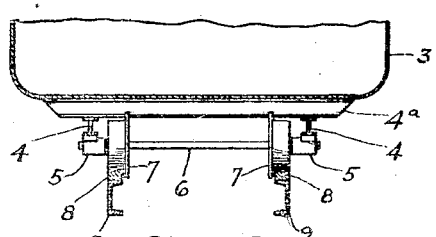

Patented Dec. 28, 1926.

1,612,223

UNITED STATES PATENT OFFICE.

DIGHTON A. ROBINSON, OF MINNEAPOLIS, MINNESOTA.

GRAVITY-DUMPING TRUCK BODY.

Application filed January 16, 1922. Serial No. 529,615.

The object of my invention is to provide a tilting or dumping body or box for a truck having its center of gravity, when the truck body is empty or unloaded, in front of the tilting axis, so that the body stands normally, when not loaded, in a substantially horizontal position, the center of gravity shifting, when the body is loaded, to the rear of the tilting axis, so that when the body is unlocked or released it automatically tilts to dump or discharge its load.

Another object of the invention is to provide means for bodily moving the entire truck body or box towards the rear of the truck frame, during the tilting or dumping operation, and moving it forward upon the frame as the body is restored to its normal or load receiving position.

Another object of the invention is to provide means for controlling the tilting movement of the truck body or box.

Other objects of the invention will appear from the following detailed description, taken in connection with the accompanying drawings, in which—

Figure 4 is a sectional elevation of the rear end of a motor truck showing the box in its unloading position and also the means for opening the end gate;

Figure 5 is a detail view of one of the rear supporting arms;

Figure 6 is a detail view of the box supporting carriage showing the same mounted on the side beams of the truck chassis.

Figure 7 is a view similar to Figure 5, showing a modified construction.

Figure 1:
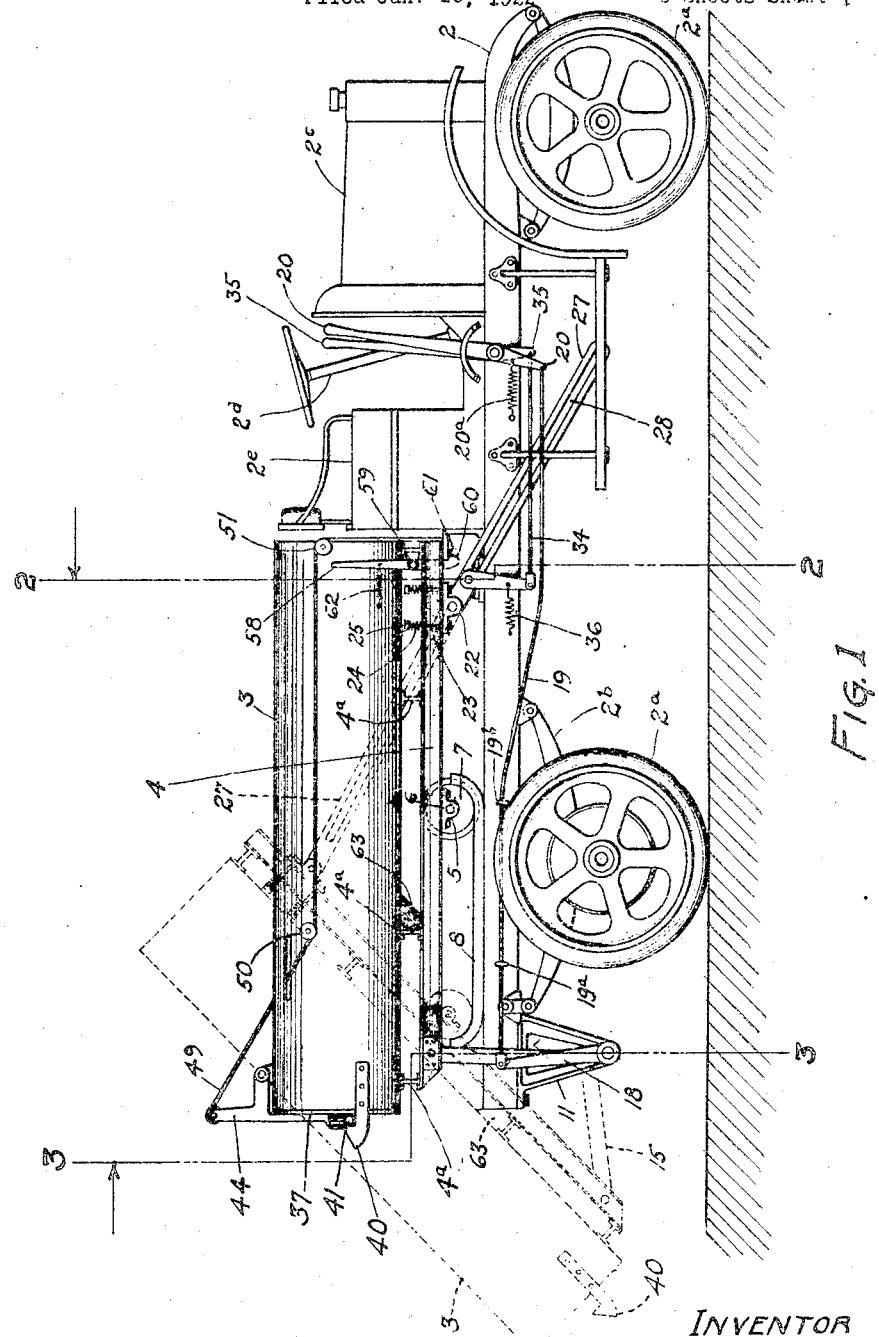
Figure 1 is a side elevation of a motor truck showing my invention applied thereto.

In the drawings, 2 represents, as a whole, the frame or chassis of a motor truck, provided with the usual wheels 2$^a$, springs 2$^b$, hood 2$^c$, steering post 2$^d$ and seat 2$^e$. The truck frame and its supporting steering, and driving devices, may be of any usual or preferred construction. The truck may be operated by any preferred power means, such as an electric, steam, or gas operated motor. If preferred the truck may be without any driving means, and may be drawn by animal power, or be hauled as a trailer, behind another truck or vehicle.

The truck body or carrying box 3 may be of any suitable size, shape and construction. It is here shown as an open box mounted upon a steel frame, formed of longitudinally extending I-beams 4, and laterally extending I-beams 4$^a$. To this frame bearing 5, a body or box supporting carriage, is secured. Said carriage consists of a shaft 6, rotatably mounted in the bearings 5, and wheels 7, resting on guide rails 8, secured by suitable means to the side beams 9 of the truck chassis. The rails 8 are preferably provided at their ends with stops 10 to limit the forward and rearward movement of the truck supporting wheels 7 thereon.

Figure 3:
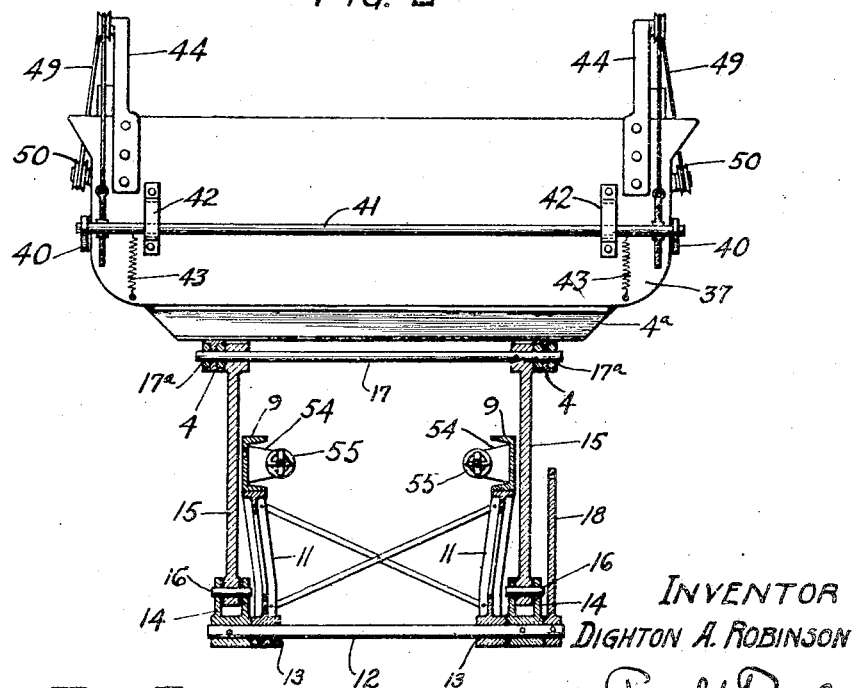
Figure 3 is a sectional elevation on the line 3—3 of Figure 1, looking in the direction of the arrow.

The rear ends of the side beams 9 are preferably provided with brackets 11, depending therefrom, and having a shaft 12 rotatably mounted in bearings 13, in said brackets (Figures 3 and 5). On each end of the shaft 12 a forked crank arm 14 is secured, to which supporting arms 15 are pivoted at 16. In the upper ends of the arms 15 a shaft 17 is mounted, which extends transversely of the box frame, being pivotally mounted in bearings 17$^a$ in the frame 4 of the box 3.

On one end of the shaft 12 an upright arm 18 is mounted, to which is pivoted a connecting rod 19 extending forwardly, and connected to an operating lever 20, suitably supported on the truck frame at a convenient place near the operator's seat (Figure 1). Guides 9$^a$ and 9$^b$ for the connecting rod 19 may be suitably secured upon the beams 9, or other part of the truck frame. A tension spring 20$^a$ is connected at one end to the lower end of the lever 20 and has its other end secured to one of the side beams 9 of the truck chassis.

Stop lugs 21 are preferably provided on each of the brackets 11, to engage the crank arms 14, when the box 3 is in its loaded position, as shown in Figure 5. It will be seen that when the box is in this position, the pivots 16 have passed slightly beyond the center, or past a line drawn through the upper shaft 17, and the lower shaft 12. This arrangement provides a locking means, and prevents the box from starting its dumping operation should the other locking mechanisms, provided at the forward end of the box, and hereinafter described, fail to perform their functions.

The above mechanism provides a very simple and substantial means for supporting the rear end of the box, and also a very simple locking means.

To the forward end of the frame 4, brackets 22 are yieldingly secured by suitable means, such as bolts 23, compression springs 24, and nuts 25. A shaft 26 is pivotally mounted in said brackets, and supports a pair of distance bars 27, having slots 28, engaging a shaft 29, mounted in the threaded bearing brackets secured to the side beams 9 of the truck chassis.

Figure 2:
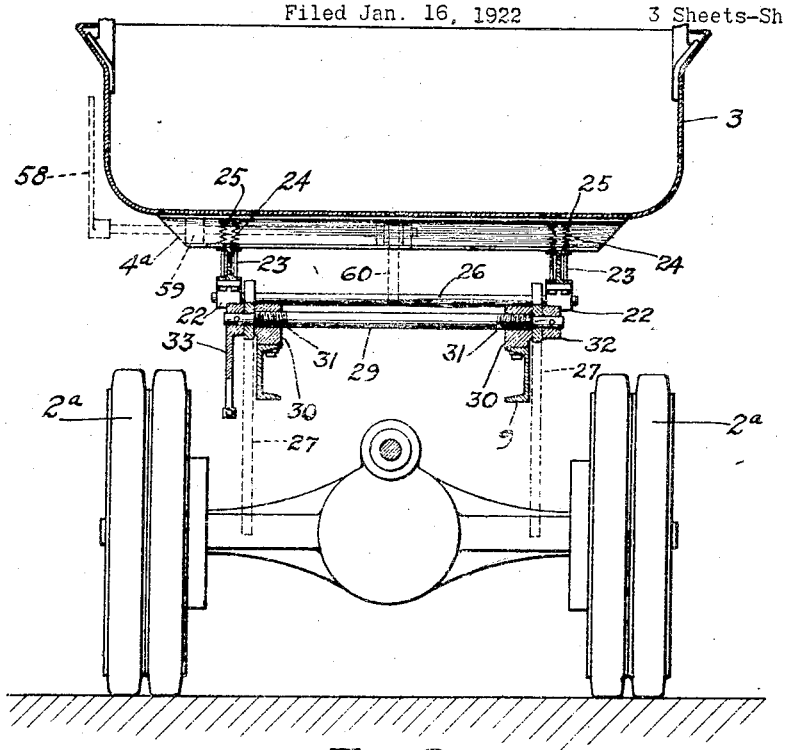
Figure 2 is a sectional elevation on the line 2—2 of Figure 1, looking in the direction of the arrow.

The shaft 9 is provided with a right and left hand threaded portion 31 (Figure 2) which engages corresponding threads in each of the bearing brackets 30. A collar 32, and an arm 33, are secured to each end of said shaft adjacent the distance bars 27. A connecting rod 34 is pivoted to the depending end of the arm 33 and extends forwardly and is pivoted to an operating lever 35, mounted on the frame of the truck adjacent the lever 20. A tension spring 36 is connected to the lower end of the arm 33, and has one end secured to one of the side beams 9 of the truck. The tension of the spring 36 acting on the arm 33 tends to rotate the shaft 29 in the bearing brackets 30, thereby moving said brackets slightly in an outward direction, and firmly gripping, or clamping the bars 27 between said brackets and the collar 32 at one end and arm 33 at the other end of said shaft. To increase the locking effects obtained by clamping the bars 27 in the manner described, these bars may be made slightly thinner where they are gripped at both extreme positions by the movement of the brackets 30 as described. Making the bars somewhat thinner at these points has substantially the same effect as providing the bars with shoulders outside of the points where they are gripped, thereby increasing the resistance to any slipping of the bars 27 between their clamping devices.

The thin portions of the bars 27, when the same are provided, are located near one or both ends of the slotted portions of said bars, so that said bars may be more firmly clamped when at either extreme position.

These bars also serve an important purpose in controlling the tilting movement of the truck body or box. The devices that are provided for gripping these bars may be caused to clamp the sides of the bars with any desired degree of pressure during the dumping operation, thereby regulating the movement of the bars, and consequently the tilting movement of the truck body or box, when said body or box is moving backward and tipping down into its discharging position. Moreover, the spring supported brackets 24 are capable of yielding, as the bars reach the limit of their movement in the dumping operation, thereby cushioning the stoppage of said bars. The springs 24 may be of any desired size and their tension may be regulated by the nuts 25, thereby controlling the cushioning effect upon the bars 27.

The truck body or box is preferably provided with an open rear end, and an end gate or tail board 37 provided with arms 38, is pivoted at 39 upon the box. Projecting from the walls of the box 1 I preferably arrange at each side thereof a latch hook 40 and I provide a latch rod 41 arranged upon the outside of the end gate and passing through slotted lugs 42, 42, so as to be capable of moving upward and downward therein. Springs 43 are connected to the shaft 41 and to the end gate. The ends of said shaft 41 project beyond the ends of the end gate 37, and when the end gate is closed the ends of the shaft 41 engage the hooks 40 arranged on the walls of the truck box or body, thereby locking the end gate in position. The end gate is also provided with upwardly extending arms 44 and suitable cables 49 are connected at their ends to the latch rod 41 and said cables pass over pulleys on the arms 44 and then under and over pulleys 50, 51 and 52, passing through boxes 54 carried by the side beams 9 of the frame, and connected to suitable spiral springs 55, said springs having their ends connected by lugs 56 on the truck frame. On the cables 49, between the boxes 54 and the end of the spring 55, adjustable blocks 57 are provided, which may be clamped in any desired position upon said cables.

In operation, when a truck body is to be dumped the end gate 37 will be tilted through the mechanism described, and this operation may be brought about automatically by a proper adjustment of the block 57 on the cables 49.

When the blocks 57 on the cables are properly adjusted on said cables, said blocks will hit the stationary blocks 54 and stop the movement of the cables 49 against the tension of the springs 55. When this occurs the further dumping movement of the truck body will cause the end gate 37 to open, the latch rod 41 moving upward out of engagement with the hooks 40 and a further dumping movement of the box or truck body causing the door to swing open and to be held in substantially the position shown by full lines in Figure 4, until the box begins to tip downward when it will automatically close as shown in Figure 1.

As an additional safety means for locking the truck body or box in its horizontal or receiving position I prefer to provide a lever 58 pivoted at 59 upon the frame of the box and having a hook 60 adapted to engage a lug 61 on the truck frame. A spring 62 is connected to the lever 58 and also to the box 3, said spring tending to hold the hook end of the lever in engagement with the stationary lug.

I also prefer to provide the box frame with a rubber buffer 63 preferably secured to one of the cross beams 4ª in position to engage the end of the truck frame when the box is tilted, as shown in Figure 4.

I may provide a partition 65 at the forward end of the tilting box or body and arrange in the space cut off by said partition a suitable amount of gravel or other heavy material 64. This is employed to insure the tilting of the box or body back to a horizontal position after the load has been discharged therefrom.

Operation.

When the truck is unloaded the center of gravity of the truck body is forward of the shaft 6, and the box tends to remain in its horizontal or receiving position. When the truck body is filled with material the center of gravity shifts to the rear of the shaft 6, and the rear end of the truck body tends to tip downward, and will immediately and automatically dump its load as soon as the locking devices are released.

I have here shown three separate locking devices for holding the truck body in a horizontal or lever position when it is loaded, it being essential that the locking devices be not accidentally operated so as to permit the box to dump itself before such action is desired.

The locking device consisting of the upright bars 15, pivoted to the crank arms 14, and arranged to be thrown beyond the center so that the crank arms 14 rest against the stops 21 (Figure 5), may be considered an auxiliary lock which may be dispensed with if desired. With this arrangement the rear end of the truck box or body is firmly supported and dumping operation is impossible until the shaft 12 is turned so as to throw the crank arm and pivot 16 forward of the vertical line between the shaft 12 and the shaft 17.

As already stated the shaft 12 is operated by means of a crank arm 18, the rod 19 and the lever 20.

It is also necessary to release the gripping means engaging the sliding bar 27, which, as hereinbefore stated, may be done by means of the operating lever 35.

It is also necessary before the box will dump to disengage the latch or hook 60 from the stationary lug or plate 61.

When all of the locking devices have been released the weight in the rear part of the box or truck body together with the weight of the part of said truck body and the steel supporting frame that is in the rear of the shaft 6, will overbalance the weight of the corresponding parts in front of said shaft, and the rear end of the box or truck body, and its supporting frame, will begin to tip downward, turning about the shaft 6 as a center. At the same time the bars 15 will act as radius bars, and will force the box, or truck body, to move backward, the wheels 7 of the carriage, traveling on the rails 8 until the parts are brought into the position shown by full lines in Figure 4. Before the parts reach this position the end gate 37 will be turned into the position shown in Figure 4, and the box will stand at an angle of about 45 degrees. The load will all run out of the box and the weight of the forward end of the box, being now greater than the weight of the rear portion, the box will turn down again into a horizontal position. As the rear end of the box travels upward the bars 15 will move the box forward until it returns to the normal position shown in Figure 1.

The latch or hook 60 will automatically engage the plate or lug 61, and the spring 20ª will automatically throw the crank arm 18 beyond the center bringing the cranks 14 into engagement with the lug or hook 21.

The operator will actuate the screw clamping device engaging the sliding bar 27, by means of the lever 35.

The details of the construction of the mechanism and particularly the details of the locking devices may be varied in many particulars without departing from my invention.

If preferred I may omit the pivot 16, and crank arms 14, to which the lower ends of the bars 15 are pivoted and pivot the lower ends of said bars upon stationary supports, as shown in Figure 7. In this event the bars 15 will function only as distance bars and will have no locking effect.

I claim as my invention:

1. The combination with a truck frame, of a load-carrying box pivotally supported upon said frame, a rock shaft mounted transversely of said frame beneath the rear portion of said box, crank arms on said shaft, supporting arms pivotally connected with said crank arms and with the rear portion of said box, and means for moving said box rearwardly on said truck frame, the pivots connecting said supporting arms with said crank arms, moving past the center of said shaft and locking said box in its horizontal or loading position.

2. The combination with a truck frame, of a load-carrying box pivotally supported thereon, a shaft mounted transversely of said frame beneath the rear portion of said box and frame, supporting arms pivotally connecting said shaft with said box and adapted for adjustment to move their pivotal connections with said shaft past the center of said shaft whereby said box will be locked against premature tilting.

3. The combination with a truck-frame having side beams and guide rails thereon formed with end stops, of a traveling carriage pivotally supported from wheels mounted to travel on the guide-rails, and a load carrying box supported upon said carriage and arranged with the center of gravity of the unloaded or empty box in front of said wheels, the capacity of the portion of the box that is in the rear of the wheels being greater than that of the portion of the box in front of said wheels, whereby, when the box is loaded, the center of gravity is in the rear of its wheels, and means for locking said box in a horizontal or load receiving position. The relative position of said box and its pivots being unchanged during the tilting movement of said box.

4. The combination with a truck frame having side beams and guide rails secured thereto and provided with end stops, of a load-carrying box having wheels supported upon said guide rails and adapted to roll thereon and move said box forward and backward on said truck frame, a shaft mounted transversely of said truck frame beneath said box, and means pivotally connecting said shaft with said box and adapted to normally prevent tilting of said box on said truck frame.

5. The combination with a truck frame, having side beams and guide rails secured thereto, of a load-carrying box having wheels to rest and roll on said guide rails, brackets depending from said beams, a shaft having bearings in said brackets transversely of said frame, said shaft having crank arms thereon and supporting arms pivotally connecting said crank arms with the rear portion of said loading box.

6. The combination with a truck frame having guide rails threon, of a loading box having wheels to rest and roll on said guide rails, and means for limiting the movement of said wheels at the ends of said rails, the center of gravity of the unloaded or empty box being in front of said wheels and the center of gravity being in the rear of said wheels when the box is loaded, radius bars pivotally connected wth the rear portion of said box, and mechanism cooperating therewith for normally locking said box in its horizontal or loading position, means for actuating said mechanism for moving said bars to their releasing position and drawing said box backward by the weight of its load to its tilted position.

7. The combination with a truck frame, of a loading box pivotally supported thereon for forward and backward movement, a shaft mounted transversely of said frame and having a pivotal connection with the rear portion of said box, an arm mounted on said shaft, a connecting rod pivotally attached thereto, an operating lever for said connecting rod, the movement of said arm and shaft locking said box against a tilting movement or releasing it to allow it to move to its dumping position.

8. The combination, with a truck frame and a longitudinally movable carriage arranged thereon, of a load carrying box pivotally supported upon said carriage, slotted distance bars pivotally connected to said box and having a sliding pivotal connection with said truck frame, and means for locking said box in its horizontal or load receiving position.

9. The combination with a box frame and a longitudinal movable two-wheeled carriage thereon, of a load carrying box pivotally supported upon the axle of said carriage, slotted distance bars pivotally connected to said box frame and having a sliding pivotal connection with said truck, means associated with the rear of the carriage to force the carriage downwardly, whereby the rear end of the box is tilted or tipped downward when the box and its supporting carriage are caused to move towards the rear of the truck frame, and means for locking the box in its horizontal or load receiving position.

10. The combination, with a truck frame, with a longitudinally movable carriage arranged thereon, of a load carrying box pivotally supported upon said carriage, a crank shaft journalled upon said truck frame, slotted distance bars pivotally connected to the rear portion of said box and slidable on said crank shaft, and a stop arranged to engage said distance bars and to limit their movement in one direction.

In witness whereof, I have hereunto set my hand this 6th day of January, 1922.

DIGHTON A. ROBINSON.